US008764896B2

(12) United States Patent
Katsuragi

(10) Patent No.: US 8,764,896 B2
(45) Date of Patent: Jul. 1, 2014

(54) AQUEOUS INK FOR LIQUID JETTING DEVICE AND INK CARTRIDGE CONTAINING THE SAME

(75) Inventor: Koji Katsuragi, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 260 days.

(21) Appl. No.: 13/377,987

(22) PCT Filed: Jun. 25, 2010

(86) PCT No.: PCT/JP2010/061294
§ 371 (c)(1),
(2), (4) Date: Dec. 13, 2011

(87) PCT Pub. No.: WO2011/002072
PCT Pub. Date: Jan. 6, 2011

(65) Prior Publication Data
US 2012/0113195 A1    May 10, 2012

(30) Foreign Application Priority Data

Jun. 30, 2009   (JP) ................................ 2009-155430

(51) Int. Cl.
*C09D 11/02*       (2014.01)
(52) U.S. Cl.
USPC .................. 106/31.78; 106/31.49; 106/31.58; 106/31.89
(58) Field of Classification Search
CPC ...... C09D 11/30; C09D 11/38; B41J 2/17503
USPC .......... 106/31.43, 31.58, 31.59, 31.75, 31.86, 106/31.87, 31.89, 31.49, 31.78; 347/86
See application file for complete search history.

(56) References Cited

U.S. PATENT DOCUMENTS

| | | | | |
|---|---|---|---|---|
| 6,436,180 | B1* | 8/2002 | Ma et al. ..................... | 106/31.59 |
| 6,506,806 | B2* | 1/2003 | Taylor et al. .................. | 516/198 |
| 6,630,017 | B2* | 10/2003 | Ma et al. ..................... | 106/31.59 |
| 7,351,748 | B2 | 4/2008 | Nagashima et al. ............. | 516/9 |
| 7,789,955 | B1* | 9/2010 | Gamblin et al. ........... | 106/31.75 |
| 8,080,102 | B2* | 12/2011 | Grant et al. ................ | 106/31.86 |
| 8,101,012 | B2* | 1/2012 | Grant et al. ................ | 106/31.58 |
| 8,343,268 | B2* | 1/2013 | Ma et al. .................... | 106/31.89 |
| 8,382,271 | B2* | 2/2013 | Goto et al. .................... | 347/100 |
| 2002/0014611 | A1 | 2/2002 | Taylor et al. ................ | 252/8.61 |

(Continued)

FOREIGN PATENT DOCUMENTS

| | | |
|---|---|---|
| CN | 1436219 A | 8/2003 |
| CN | 101316905 A | 12/2008 |

(Continued)

OTHER PUBLICATIONS

Combined Office Action and Search Report issued Aug. 1, 2013 in Chinese Patent Application No. 201080029642.4 (with English translation).

(Continued)

*Primary Examiner* — Helene Klemanski
(74) *Attorney, Agent, or Firm* — Oblon, Spivak, McClelland, Maier & Neustadt, L.L.P.

(57) ABSTRACT

To provide an aqueous ink for a liquid jetting device, containing: (A) a fluorosurfactant; and (B) N-alkyl-2-pyrrolidone, wherein an alkyl group contained in the (B) N-alkyl-2-pyrrolidone is a C4-10 alkyl group.

14 Claims, 5 Drawing Sheets

(56) References Cited

U.S. PATENT DOCUMENTS

| | | | |
|---|---|---|---|
| 2005/0170989 A1 | 8/2005 | Nagashima et al. | 510/411 |
| 2007/0120928 A1 | 5/2007 | Ma et al. | 106/31.58 |
| 2010/0007692 A1 | 1/2010 | Vanmaele et al. | 347/21 |
| 2010/0047454 A1 | 2/2010 | Voeght et al. | 106/31.6 |
| 2011/0279517 A1* | 11/2011 | Katsuragi | 347/21 |
| 2012/0169815 A1* | 7/2012 | Katsuragi | 347/86 |

FOREIGN PATENT DOCUMENTS

| | | |
|---|---|---|
| CN | 101400750 A | 4/2009 |
| JP | 2002 294122 | 10/2002 |
| JP | 2003-535950 A | 12/2003 |
| JP | 4092583 | 3/2008 |
| JP | 2009 1741 | 1/2009 |
| JP | 2010 184368 | 8/2010 |
| WO | WO 01/94480 A2 | 12/2001 |
| WO | WO 03/097717 A1 | 11/2003 |
| WO | 2007 094879 | 8/2007 |
| WO | 2008 074589 | 6/2008 |

OTHER PUBLICATIONS

Office Action issued Jul. 16, 2013 in Japanese Patent Application No. 2009-155430.

International Search Report Issued Oct. 12, 2010 in PCT/JP10/61294 Filed Jun. 25, 2010.

Office Action issued Mar. 21, 2014 in Chinese Patent Application No. 2010829642 filed Jun. 25, 2010 (w/English translation).

* cited by examiner

AQUEOUS INK FOR LIQUID JETTING DEVICE AND INK CARTRIDGE CONTAINING THE SAME

TECHNICAL FIELD

The present invention relates to an aqueous ink for a liquid jetting device, and ink cartridge housing the ink therein.

BACKGROUND ART

One of the characteristics expected for an aqueous ink for a liquid jetting device is an appropriate wetting ability. The appropriate wetting ability increases the penetration speed of the ink into a recording medium, which can improve abrasion resistance or problems such as bleeding.

It is common to add a surfactant to an ink for improving the wetting ability of the ink. Especially, because a surfactant having a fluoroalkyl group has a function of significantly reducing a surface tension of a fluid to which the surfactant is added, and thus this surfactant is widely used for an aqueous ink for a liquid jetting device. However, high surface activeness easily causes formations of micelles between the surfactants. As a result, the ink containing such surfactant has a demerit such that air bubbles are easily generated (i.e. formed).

The generation of air bubbles causes various troubles in a recording system. For example, in case of a printer equipped with a movable printing head, an ink stored in a subtank is foamed by vibration caused by a printing operation, which causes troubles such as ink leakage due to errors in detection of the ink. In addition, bubbles remain on an absorption cap as a result of an ink absorbing operation for maintenance, which may cause troubles such that meniscus is destroyed the next time a maintenance operation is performed.

Patent Literature 1 discloses that a silicone defoaming agent is added to an ink containing a fluorosurfactant, as the ink containing the fluorosurfactant tends to generate air bubbles (PLT1). Here, the defoaming agent enters and is scattered in lamella layers of bubbles so that the surfactant is replaced with the defoaming agent. As a result, the bubbles disappear. In this defoaming system, the defoaming agent needs to be incompatible to the ink system. As the defoaming agent used in an aqueous system, hydrophobic silica or polyurea is generally used. However, if the defoaming agent is not dissolved, and is present as particles in the system due to its hydrophobicity, clogging of a filter may occur. For this reason, it is desirable that such defoaming agent be not added. Moreover, the addition of the silicone defoaming agent does not provide a sufficient defoaming effect.

Patent Literature 2 discloses an ink containing N-octyl-2-pyrrolidone together with a pigment and a water-soluble resin. However, surface activeness of N-octyl-2-pyrrolidone is not sufficient, and thus the resulting ink has undesirable penetration ability to a recording medium. Specifically, the ink has deteriorated fixing ability just after printing, undesirable coloring performance, and low image quality.

CITATION LIST

Patent Literature

[PTL1] Japanese Patent Application Laid-Open (JP-A) No. 2009-1741
[PTL2] JP-A No. 2002-294122

SUMMARY OF INVENTION

Technical Problem

An object of the present invention is to provide an ink containing a fluorosurfactant, which significantly improves the defoaming property.

Solution to Problem

<1> An aqueous ink for a liquid jetting device, containing:
(A) a fluorosurfactant; and
(B) N-alkyl-2-pyrrolidone,
wherein an alkyl group contained in (B) N-alkyl-2-pyrrolidone is a C4-10 alkyl group.

<2> The aqueous ink according to <1>, wherein (A) the fluorosurfactant is the compound having a Griffin's HLB value of 10 to 16, and expressed by the following general formula 1:

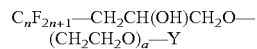
$$C_nF_{2n+1}-CH_2CH(OH)CH_2O-(CH_2CH_2O)_a-Y \qquad \text{General Formula 1}$$

where n is an integer of 2 to 6, a is an integer of 15 to 50, and Y is either $-C_bH_{2b+1}$ or $-CH_2CH(OH)CH_2-C_mF_{2m+1}$, in which b is an integer of 11 to 19, and m is an integer of 2 to 6.

<3> The aqueous ink according to <2>, wherein the fluorosurfactant expressed by the general formula 1 has the structure expressed by the following structural formula 2:

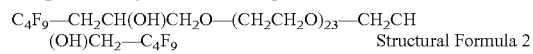
$$C_4F_9-CH_2CH(OH)CH_2O-(CH_2CH_2O)_{23}-CH_2CH(OH)CH_2-C_4F_9 \qquad \text{Structural Formula 2}$$

<4> The aqueous ink according to any one of <1> to <3>, wherein the alkyl group contained in (B) N-alkyl-2-pyrrolidone is a straight or branched C6-8 alkyl group.

<5> The aqueous ink according to any one of <1> to <4>, wherein (B) N-alkyl-2-pyrrolidone is N-octyl-2-pyrrolidone.

<6> The aqueous ink according to any one of <1> to <5>, wherein an amount of (A) the fluorosurfactant is 30% by mass or less relative to the total amount of (A) the fluorosurfactant and (B) N-alkyl-2-pyrrolidone.

<7> The aqueous ink according to <6>, wherein an amount of (A) the fluorosurfactant is 20% by mass or less relative to the total amount of (A) the fluorosurfactant and (B) N-alkyl-2-pyrrolidone.

<8> The aqueous ink according to any one of <1> to <7>, wherein the total amount of (A) the fluorosurfactant and (B) N-alkyl-2-pyrrolidone contained in the aqueous ink is 1% by mass or less relative to the total amount of the aqueous ink.

<9> The aqueous ink according to <8>, wherein the total amount of (A) the fluorosurfactant and (B) N-alkyl-2-pyrrolidone contained in the aqueous ink is 0.1% by mass to 1% by mass relative to the total amount of the aqueous ink.

<10> The aqueous ink according to <9>, wherein the total amount of (A) the fluorosurfactant and (B) N-alkyl-2-pyrrolidone contained in the aqueous ink is 0.3% by mass to 0.5% by mass relative to the total amount of the aqueous ink.

<11> The aqueous ink according to any one of <1> to <10>, further containing a coloring agent.

<12> The aqueous ink according to <11>, wherein the coloring agent is coloring agent particles which are inorganic particles each coated with an organic pigment or carbon black.

<13> The aqueous ink according to any one of <1> to <12>, further containing a water-soluble organic solvent.

<14> The aqueous ink according to <13>, wherein the water-soluble organic solvent is at least one selected from the group consisting of polyhydric alcohol, polyhydric alcohol alkyl ether, polyhydric alcohol aryl ether, a nitrogen-containing heterocyclic compound, amide, amine, a sulfur-containing compound, propylene carbonate, and ethylene carbonate.

<15> An ink cartridge, containing:
a container; and
the aqueous ink as defined in any one of <1> to <14>, which is housed in the container.

Advantageous Effects of Invention

The present invention solves the problems caused due to foaming of the ink, by providing an aqueous ink for a liquid jetting device containing a fluorosurfactant and N-alkyl-2-pyrrolidone, and obtains images of high image density and high quality.

DESCRIPTION OF EMBODIMENTS

Figure 1:
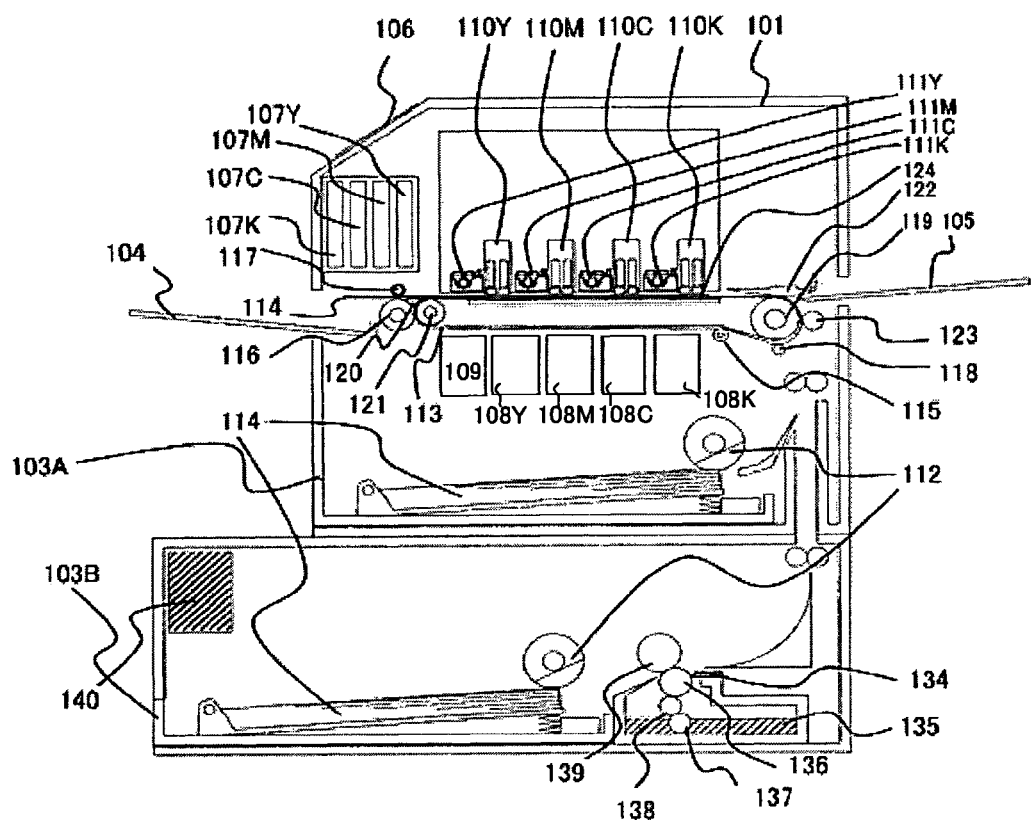
FIG. 1 is a schematic diagram (side plane explanatory view) illustrating one example of an image forming device using an ink cartridge of the present invention.

The present invention will be specifically explained hereinafter.

The aqueous ink for a liquid jetting device contains (A) a fluorosurfactant; and (B) N-alkyl-2-pyrrolidone, in which an alkyl group contained in the (B) N-alkyl-2-pyrrolidone is a C4-10 alkyl group.

The (A) fluorosurfactant is preferably the compound having a Griffin's HLB value of 10 to 16, expressed by the following general formula 1:

General Formula 1

In the general formula 1, n is an integer of 2 to 6, a is an integer of 15 to 50, and Y is either —$C_bH_{2b+1}$ or —$CH_2CH(OH)CH_2$—$C_mF_{2m+1}$, in which b is an integer of 11 to 19, and m is an integer of 2 to 6.

Here, n is an integer of 2 to 6, preferably 4 to 6, and even more preferably 4. When n is 7 or more, the water-solubility of the compound expressed by the general formula 1 is significantly low, and it does not dissolve in water. From the standpoint of obtaining desirable surface activeness, n is preferably 2 or more, more preferably 4 or more. Furthermore, from the standpoint of obtaining desirable water solubility, surface activeness, and biodegradability in case it is released in the environment after use, n is particularly preferably 4. Moreover, the number of "a" affects the water solubility of the compound expressed by the general formula 1. When the compound is used in an aqueous coating material, aqueous ink, or photosensitive photographic material, a is preferably in the approximate range of 20 to 45, more preferably in the approximate range of 20 to 25.

The HLB value shows the balance between hydrophilic groups and lipophilic groups contained in the surfactant, has a range of 0 to 20 where the value closer to 0 shows the higher lipophilicity, and the value closer to 20 shows the higher hydrophilicity. There are several calculation formulae for obtaining this value, but in the present invention, the method proposed by Griffin is used.

In the present invention, when the HLB value is less than 10, it may be difficult for the components of the ink to be dissolved or dispersed in water. When the HLB value is more than 16, the lipophilicity of the ink, which is necessary for the ink, tends to be low.

Especially, the compound is preferably the compound expressed by the following structural formula 2.

Structural Formula 2

The surfactant expressed by the structural formula 2 does not contain perfluorooctanesulfonic acid (PFOS) and perfluorooctanoic acid (PFOA), and thus it is advantageous as it is environmentally friendly.

However, the surfactant expressed by the structural formula 2 has extremely high surface activeness, as it is a fluorosurfactant. Therefore, when such surfactant is used alone, air bubbles are significantly formed in the ink even though a defoaming agent is added to the ink as has been often done in the conventional art, and the formed bubbles do not disappear. Therefore, in the present invention, (B) N-alkyl-2-pyrrolidone is added to the ink in combination with the aforementioned surfactant for preventing the generation of bubbles.

When N-alkyl-2-pyrrolidone for use in the present invention has a long alkyl chain, water solubility thereof is significantly low, and it may not dissolve in water. On the other hand, N-alkyl-2-pyrrolidone with an excessively short alkyl chain reduces the defoaming effect thereof. Therefore, the alkyl group in N-alkyl-2-pyrrolidone is a straight or branched C4-10 alkyl group, preferably a straight or branched C6-8 alkyl group. Especially, N-octyl-2-pyrrolidone having a straight chain C8 alkyl group is preferable. N-octyl-2-pyrrolidone has a small HLB value, such as 6, and is a low-foamable nonionic surfactant. Therefore, N-octyl-2-pyrrolidone itself functions as a surfactant. Compared to the fluorosurfactant, the surface activeness of N-octyl-2-pyrrolidone is significantly low, but it independently or in combination exhibits an excellent effect as a defoaming agent.

An amount of the fluorosurfactant contained in the ink is preferably 30% by mass or less, more preferably 20% by mass or less relative to the total amount of the fluorosurfactant and N-alkyl-2-pyrrolidone. When the amount thereof is more than 30% by mass, bubbles may not disappear. When the fluorosurfactant is added to the ink in an amount of 30% by mass or less, it is possible to maintain low surface tension of the ink due to high surface activeness of the fluorosurfactant, while maintaining high defoaming performance.

The aqueous ink generally contains a coloring agent, a water-soluble organic solvent, a surfactant, and water.

The combined amount of the fluorosurfactant and N-alkyl-2-pyrrolidone is preferably 0.1% by mass to 1% by mass, more preferably 0.3% by mass to 0.5% by mass, relative to the total amount of an aqueous fluid (i.e. an aqueous ink). When the amount thereof is more than 1% by mass, the amount of N-alkyl-2-pyrrolidone is excessive and thus the solubility of N-alkyl-2-pyrrolidone to the solvent becomes low. Moreover, it is also undesirable in terms of defoaming performance, as the total amount of the fluorosurfactant contained in the aqueous liquid increases. As mentioned earlier, the fluorosurfactant has an extremely strong surface activity. Therefore, even if a large amount of the fluorosurfactant is added, it does not largely affect the surface tension of the aqueous liquid. On the other hand, even if the amount thereof is reduced, an intended surface tension of the aqueous liquid is still attained. However, the effect of the fluorosurfactant cannot be attained when the combined amount of the fluorosurfactant and N-alkyl-2-pyrrolidone is lower than 0.1% by mass.

As the coloring agent, any dye or pigment known in the art of an aqueous ink can be used. Coloring particles, in which inorganic particles are each coated with an organic pigment or carbon black, may also be used as the coloring agent.

Examples of the method of coating each inorganic particle with carbon black include: a method of drying in liquid by deposition, precipitation, or the like; a drying-mixing method in which a mechanical force is applied while mixing. Examples of the method of coating each inorganic particle with an organic pigment include: a method in which an organic pigment is precipitated in presence of inorganic particles; and a method in which inorganic particles and an organic pigment are mechanically mixed and ground. If inorganic particles are coated with an organic pigment that is excellent in thermal stability, chemical deposition can be used for coating. Moreover, if necessary, an organosilane compound layer formed by polysiloxane or alkyl silane can be provided between an inorganic particle and an organic pigment, so that adhesion between the inorganic particle and the organic pigment can be improved.

Examples of the inorganic particles include titanium dioxide, silica, alumina, iron oxide, iron hydroxide, tin oxide. Regarding a shape of the inorganic particle, those having a small aspect ratio are preferable. In the case where a color coloring agent is absorbed on a surface of the inorganic particle, the inorganic particle is preferably clear with no tint, or white. Black inorganic particles may be used when a black coloring agent is absorbed on a surface of each inorganic particle.

A primary particle diameter of the inorganic particle is preferably 100 nm or less, more preferably 5 nm to 50 nm.

Examples of the organic pigment for coating the inorganic pigments include: a black pigment such as aniline black; and a color pigment such as anthraquinone, phthalocyanine blue, phthalocyanine green, diazo, monoazo, pyranthrone, perylene, heterocyclic yellow, quinacridon, and (thio)indigo.

Among them, the phthalocyanine pigment, quinacridon pigment, monoazo yellow pigment, diazo yellow pigment, and heterocyclic yellow pigment are particularly preferable in view of their coloring properties.

Examples of the phthalocyanine pigment include copper phthalocyanine blue or a derivative thereof (C.I. Pigment Blue 15:3, and C.I. Pigment Blue 15:4), and aluminum phthalocyanine.

Examples of the quinacridon pigment include C.I. Pigment Orange 48, C.I. Pigment Orange 49, C.I. Pigment Red 122, C.I. Pigment Red 192, C.I. Pigment Red 202, C.I. Pigment Red 206, C.I. Pigment Red 207, C.I. Pigment Red 209, C.I. Pigment Violet 19, and C.I. Pigment Violet 42.

Examples of the monoazo yellow pigment include C.I. Pigment Yellow 74, C.I. Pigment Yellow 109, C.I. Pigment Yellow 128, and C.I. Pigment Yellow 151.

Examples of the diazo yellow pigment include C.I. Pigment Yellow 14, C.I. Pigment Yellow 16, and C.I. Pigment Yellow 17.

Examples of the heterocyclic yellow pigment include C.I. Pigment Yellow 117, and C.I. Pigment Yellow 138.

A mass ratio (inorganic particles/coloring agent) of the inorganic particles to the coloring agent (e.g. the organic pigment, and carbon black) is preferably 3/1 to 1/3, more preferably 3/2 to 1/2. When the proportion of the coloring agent is too small, coloring properties and/or coloration ability of the coated particles may be low. When the proportion of the coloring agent is too large, the transparency or color tone of the coated particles may be degraded.

Examples of commercially available coloring particles in which inorganic particles are each coated with an organic pigment or carbon black include a silica/carbon black composite material, a silica/phthalocyanine C.I. PB15:3 composite material, a silica/diazo yellow composite material, and a silica/quinacridon C.I. PR122 composite material, all manufactured by Toda Kogyo Corp. These materials have small primary particles diameters, and thus are suitably applied.

For example, if inorganic pigments each having a primary particle diameter of 20 nm are coated with an equal amount of an organic pigment, the coated particles will each have a primary diameter of approximately 25 nm. Therefore, provided that these particles are dispersed maintaining the state of primary particles by using an appropriate dispersing agent, an extremely finely dispersed pigment ink having a dispersed particle diameter of 25 nm can be obtained.

A primary diameter of the coloring particle in the aqueous ink is preferably 5 nm to 100 nm, more preferably 30 nm to 80 nm. When the primary diameter thereof is less than 5 nm, the resulting ink may increase its viscosity after a long period of storage, or the coloring particles may cause aggregations. When the primary diameter thereof is more than 100 nm, in the case where the resulting ink is used to print on a piece of paper or a film, the obtained print may have a printed portion which has low color saturation and brightness. Note that, the primary particle diameter of the coloring particles means a minimum unit for the coloring particle that cannot be mechanically sheared any smaller.

An amount of the coloring particles contained in the aqueous ink is preferably 1% by mass to 20% by mass, more preferably 2% by mass to 15% by mass.

The aqueous ink uses water as a solvent, but may further contain a water-soluble organic solvent in combination for the purpose of preventing the ink from being dried, or increasing dispersion stability. As the water-soluble organic solvent, two or more thereof may be used in combination.

Examples of the water-soluble organic solvent include polyhydric alcohols, polyhydric alcohol alkyl ethers, polyhydric alcohol aryl ethers, nitrogen-containing heterocyclic compounds, amides, amines, sulfur-containing compounds, polypropylene carbonates, and ethylene carbonates.

Examples of polyhydric alcohols include glycerin, 1,3-butanediol, 3-methyl-1,3-butanediol, 1,5-pentanediol, 1,6-hexanediol, ethylene glycol, diethylene glycol, triethylene glycol, tetraethylene glycol, polyethylene glycol, propylene glycol, dipropylene glycol, tripropylene glycol, polypropylene glycol, hexylene grycol, trimethylol ethane, trimethylol propane, glycerol, 1,2,3-butanetriol, 1,2,4-butanetriol, 1,2,6-hexanetriol, and petriol.

Examples of polyhydric alcohol alkyl ethers include ethylene glycolmonoethyl ether, ethylene glycol monobutyl ether, diethylene glycol monomethyl ether, diethylene glycolmonoethyl ether, diethylene glycol monobutyl ether, tetraethylene glycol monomethyl ether, and propylene glycol monoethyl ether.

Examples of polyhydric alcohol aryl ethers include ethylene glycol monophenyl ether, and ethylene glycol monobenzyl ether.

Examples of the nitrogen-containing heterocyclic compounds include 2-pyrrolidone, N-methyl-2-pyrrolidone, N-hydroxyethyl-2-pyrrolidone, 1,3-dimethylimidazolidinone, ε-caprolactam, and γ-butyrolactone.

Examples of amines include monoethanol amine, diethanol amine, triethanol amine, monoethyl amine, diethyl amine, and triethyl amine.

Examples of the sulfur-containing compounds include dimethyl sulfoxide, sulfolane, and thiodiethanol.

Among these water-soluble solvents, glycerin, diethylene glycol, 1,3-butanediol, and 3-methyl-1,3-butanediol are particularly preferable. These exhibit excellent effect of preventing jetting failure due to solubility and moisture evaporation. Moreover, use of these water-soluble solvents provides an aqueous ink having excellent storage stability and jetting stability.

The formulated ratio of the coloring particles and the water-soluble organic solvent strongly affect the ink jetting stability from a head. If a small amount of the water-soluble organic solvent is added with a large solid content of the pigment, moisture evaporation is encouraged around an ink meniscus of a nozzle, which causes jetting failures.

The aqueous ink optionally further contains one or more water-soluble organic solvents in combination with the aforementioned water-soluble organic solvent. Such water-soluble organic solvent used in combination is such as sugars and derivatives thereof. The sugars and derivatives thereof are effective for improving anti-dryness of the ink.

Examples of the sugars and derivatives thereof include monosaccharide, disaccharide, oligosaccharides (including trisaccharide and tetrasaccharides), polysaccharides, and derivatives thereof. Specific examples thereof include glucose, mannose, fructose, ribose, xylose, trehalose, and maltotriose. Here, "polysaccharide" means sugar in a broad sense, and include compounds widely present in nature, such as α-cyclodextrin, and cellulose.

Examples of the derivatives of sugars include reducing sugars and oxidized sugars of the aforementioned sugars. Among them, sugar alcohol is preferable, and specific examples thereof include maltitol, and sorbitol.

An amount of the sugars is preferably 0.1% by mass to 40% by mass, more preferably 0.5% by mass to 30% by mass relative to the total amount of the aqueous ink.

A surfactant(s) used in combination with the surfactant (A) is suitably selected depending on the intended purpose without any restriction, provided that it does not adversely affect dispersion stability of the ink with the coloring agent, or in combination with a wetting agent or penetrating agent. In the case where the aqueous ink is used for printing on a printing paper, a fluorosurfactant or silicone surfactant having low surface tension and high leveling property is preferable, and the fluorosurfactant is particularly preferable.

As the fluorosurfactant, for example, a perfluoroalkyl sulfonicacid compound, a perfluoroalkylcarboxylic acid compound, a perfluoroalkyl phosphate compound, a perfluoroalkyl ethylene oxide adduct, and a polyoxyalkylene ether polymer compound having a perfluoroalkyl ether group at a side chain thereof are particularly preferable, as they have a only little foamability.

Examples of the perfluoroalkylsulfonic acid compound include perfluoroalkylsulfonic acid, and perfluoroalkylsulfonic acid salt.

Examples of the perfluoroalkylcarboxylic acid compound include perfluoroalkylcarboxylic acid, and perfluoroalkylcarboxylic acid salt.

Examples of the polyoxyalkylene ether polymer compound having a perfluoroalkyl ether group at a side chain thereof include a sulfuric acid ester salt of polyoxyalkylene ether polymer having a perfluoroalkyl ether group at a side chain thereof, and a salt of polyoxyalkylene ether polymer having a perfluoroalkyl ether group at a side chain thereof.

Examples of a counter ion of the salt of these fluorosurfactants include Li, Na, K, $NH_4$, $NH_3CH_2CH_2OH$, $NH_2(CH_2CH_2OH)_2$, and $NH(CH_2CH_2OH)_3$.

The fluorosurfactant may be selected from those appropriately synthesized or commercial products. Examples of the commercial products include: SURFLON series manufactured by AGC SEIMI CHEMICAL CO., LTD (S-111, S-112, S-113, S-121, S-131, S-132, S-141, and S-145); FLOURAD series manufactured by Sumitomo 3M Limited (FC-93, FC-95, FC-98, FC-129, FC-135, FC-170C, FC-430, FC-431), MEGAFACE series manufactured by DIC Corporation (F-470, F-1405, and F-474); Zonyl TBS, FSP, FSA, FSN-100, FSN, FSO-100, FSO, FS-300, and UR, manufactured by Du Pont Kabushiki Kaisha; FT-110, FT-250, FT-252, FT-400S, FT-150, and FT-400SW, manufactured by NEOS COMPANY LIMITED; and PF-151N manufactured by Omnova Solutions, Inc.

The silicone surfactant is suitably selected depending on the intended purpose without any restriction. Among the available silicone surfactants, silicone surfactants, which do not dissolve in a high pH system, are preferable. Examples thereof include side chain-modified polydimethylsiloxane, both terminals-modified polydimethylsiloxane, one terminal-modified polydimethylsiloxane, and side chain and both terminal-modified polydimethylsiloxane. Among them, those having, as a modified group, a polyoxyethylene group, polyoxyethylenepolyoxypropylene group, and the like are particularly preferable, as they have excellent properties as an aqueous surfactant.

The silicone surfactant may be selected from appropriately synthesized compounds, or commercial products. As the commercial products, for example, silicone surfactants manufactured by BYK Japan K.K., Shin-Etsu Chemical Co., Ltd., and Dow Corning Toray Co., Ltd. are readily available.

Moreover, as the silicone surfactant, a polyether-modified silicone surfactant can be used, and examples thereof include a compound in which a polyalkylene oxide structure is introduced into a Si portion of dimethyl siloxane.

The polyether-modified silicone compound may be selected from appropriately synthesized compounds, or commercial products. Examples of the commercial products include: KF-618, KF-642, and KF-643, all manufactured by Shin-Etsu Chemical Co., Ltd.

Other than the fluorosurfactant and silicone surfactant, an anionic surfactant, nonionic surfactant, amphoteric surfactant and the like may be used.

Examples of the anionic surfactant include an acetic acid salt of polyoxyethylene alkyl ether, dodecylbenzene sulfonic acid salt, succinic ester sulfonic acid salt, lauryl acid salt, and a salt of polyoxyethylene alkyl ether sulfate.

Examples of the nonionic surfactant include an acetylene glycol surfactant, polyoxyethylene alkyl ether, polyoxyethylene alkyl phenyl ether, polyoxyethylene alkyl ester, and polyoxyethylene sorbitan fatty acid ester.

Examples of the acetylene glycol surfactant include 2,4,7, 9-tetramethyl-5-decyn-4,7-diol, 3,6-dimethyl-4-octin-3,6-diol, and 3,5-dimethyl-1-hexin-3-diol. Moreover, examples of commercial products thereof include SURFYNOL series manufactured by Air Products and Chemicals, Inc. (104, 82, 465, 485, and TG).

Examples of the amphoteric surfactant include lauryl amino propionic acid salt, lauryl dimethyl betaine, stearyl dimethyl betaine, lauryl dihydroxyethyl betaine, lauryl dimethyl amine oxide, myristyl dimethyl amine oxide, stearyl dimethyl amine oxide, dihydroxyethyl lauryl amine oxide, polyoxyethylene coconut oil alkyldimethyl amine oxide, dimethylalkyl(coconut)betaine, and dimethyl lauryl betaine.

Moreover, as commercial products of the amphoteric surfactant, for example, those manufactured by Nikko Chemicals Co., Ltd., Nihon-Emulsion Co., Ltd., Nippon Shokubai Co., Ltd., TOHO Chemical Industry Co., Ltd., Kao Corporation, Adeka Corporation, Lion Corporation, Aoki Oil Industrial Co., Ltd., and Sanyo Chemical Industries, Ltd., can be readily available.

The aforementioned various surfactants may be used independently, or in combination. An surfactant, which does not easily dissolve in the aqueous ink, may dissolve when it is added to the aqueous ink in combination with other surfactants, and can be stably present in the aqueous ink.

The amount of the surfactant(s) in the aqueous ink is preferably 0.01% by mass to 3% by mass, more preferably 0.5% by mass to 2% by mass. It is preferred that the total amount of the substances, which has a higher boiling point than that of water and remains liquid in the aqueous ink at the temperature of 25° C., be 20% by mass or less, more preferably 15% by mass or less. When the total amount of the surfactant(s) is less than 0.01% by mass, the effect of the surfactant may not be attained. When the total amount thereof is more than 3% by mass, the penetration ability of the ink to a recording medium may be excessively high, which may cause low image density, or a strike-through.

It is preferred that the aqueous ink contain a carboxyl-group-containing resin. When the carboxyl-group-containing resin is contained in the aqueous ink, the carboxyl-group-containing resin reacts with an acid contained is a pre-processing liquid to cause aggregation of the pigment on a recording medium. Therefore, image density and image quality of the resulting image can be improved.

Examples of the carboxyl-group-containing resin include maleic resin, styrene-maleic acid resin, rosin-modified maleic acid resin, alkyd resin, and modified alkyd resin. Examples of commercial products thereof include: MALKYD series manufactured by Arakawa Chemical Industries, Ltd.; and HARIMAX series and HARIOHTHAL series, both manufactured by Harima Chemicals, Inc.

A manner of adding the carboxyl-group-containing resin is suitably selected without any restriction. It may be added in the state such that a pigment serving as the coloring agent is covered with the carboxyl-group containing resin. Alternatively, it may be added independently, separate from the coloring agent.

The aqueous ink optionally contains a penetrating agent, polymer particles, a pH regulator, an anti-rust agent, and antifungal agent, other than the components mentioned above.

As the penetrating agent, a C8-11 polyol compound or glycol ester compound is preferably used. These penetrating agents have an effect of increasing a penetrating speed of the ink to paper as well as an effect of preventing bleeding, and are partially water-soluble compounds having a solubility of 0.1% by mass to 4.5% by mass to water having the temperature of 25° C.

These penetrating agents have higher boiling points than that of water, and are present as fluid in the ink having the temperature of 25° C. The amount of the penetrating agent contained in the aqueous ink is preferably 0% by mass to 10% by mass, more preferably 0.5% by mass to 5% by mass.

Examples of the C8-11 polyol compound include 2-ethyl-1,3-hexanediol, and 2,2,4-trimethyl-1,3-pentanediol.

Examples of the glycol ether compound include a polyhydric alcohol alkyl ether compound, and a polyhydric alcohol aryl ether compound.

Examples of the polyhydric alcohol alkyl ether compound include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycolmonoethyl ether.

Examples of the polyhydric alcohol aryl ether compound include ethylene glycol monophenyl ether, and ethylene glycol monobenzyl ether.

As the polymer particles, those capable of forming a film are used. Here, the phrase "capable of forming a film" means that the polymer particles form a resin film when they are dispersed in water to form an emulsion, and then water is evaporated from the emulsion.

Such polymer particles function to firmly fix the coloring agent contained in the aqueous ink onto a recording medium by forming a film after volatile substances contained in the aqueous ink are evaporated. As a result, images excellent in abrasion resistance and water resistance can be provided.

In order to make the polymer particles form a film at room temperature, the lowest film forming temperature thereof is preferably 30° C. or less, more preferably 10° C. or less. Here, "the lowest film forming temperature" means the minimum temperature at which a transparent continuous film is formed when polymer emulsion obtained by dispersing the polymer particles in water is thinly applied onto a metal sheet, such as an aluminum sheet, and then a temperature thereof is increased.

The volume average particle diameter of the polymer particles are preferably 5 nm to 200 nm, more preferably 10 nm to 100 nm.

As the polymer particles, particles of a monoparticle structure may be used. For example, if an alkoxysilyl group is contained in an emulsion particle, the alkoxysilyl group is brought into contact with moisture which is left from the fusion of emulsion particles caused by moisture evaporation in the course of coating film formation, and then is hydrolyzed to form a silanol group.

If silanol groups remain, the silanol group reacts with an alkoxysilyl group or another silanol group so that a strong crosslinked structure is formed with siloxane bondings. By providing a combination of such reactive functional groups within a polymer particle in the aforementioned manner, it is possible to form a network structure by allowing these functional groups to react during film formation.

Moreover, as the polymer particles, polymer particles each having a core-shell structure may also be used. The core-shell structure includes a core and a shell which surrounds the core. The core-shell structure means that two or more polymers each having different formulations are present in the particle in the state of a phase separation. Therefore, the core-shell structure includes not only the embodiment such that a shell completely covers a core, but also the embodiment such that a shell partially covers a core. Moreover, part of the polymer of the shell may form domains within a core particle. Furthermore, the core-shell structure may be a multilayer structure of three or more layers which further contains one or more layers (which have different formulations from those of the core and shell) in between the core and the shell.

The polymer particles can be obtained by any method known in the art, such as a method in which unsaturated vinyl monomers (unsaturated vinyl polymer) are emulsion polymerized in water in the presence of a polymerization catalyst and an emulsifier.

An amount of the polymer particles contained in the aqueous ink is preferably 0.5% by mass to 20% by mass, more preferably 1% by mass to 5% by mass. When the amount thereof is less than 0.5% by mass, abrasion resistance and water resistance may not be sufficiently improved. When the amount thereof is more than 20% by mass, the jetting performance of the ink is unstable because of the increased viscosity of the ink or deposition of polymer substances contained in the ink due to drying, which may cause nozzle clogging.

The aforementioned coloring particles (composite pigment particles), in which inorganic particles are each coated with an organic pigment or carbon black, are likely to be acidic when they are mixed and dispersed in water together with an anionic dispersing agent. Since the anionic dispersing agent surrounds the surface of the composite pigment dispersed in a medium such as water, it is negatively charged. However, the entire ink is acidic, and thus the medium itself is positively charged. Accordingly, the negative charge on the surface of the particle tends to be neutralized. In such state, the dispersed particles tend to aggregate, which causes jetting failures. Therefore, it is preferred that the ink be maintained alkaline by adding a pH regulator to stabilize the dispersed state and jetting performance.

The pH value of the aqueous ink is preferably 7 to 11. When the pH value thereof is more than 11, the ink of high pH may dissolve a large amount of the materials forming an inkjet head or ink-supplying unit, which causes problems such as deterioration or leakage of the ink, and a jetting failure.

It is more preferable that the pH regulator be added in water together with the pigment and the dispersing agent during mixing and dispersing, compared to the case where it is added in water together with additives such as a wetting agent and a penetrating agent by kneading disperser. This is because the addition of the pH regulator may adversely affect the dispersed state.

Examples of the pH regulator include alcohol amines, alkali metal hydroxides, ammonium hydroxides, phosphonium hydroxides, and alkali metal carbonates.

Examples of alcohol amines include diethanol amine, triethanol amine, 2-amino-2-ethyl-1,3-propanediol.

Examples of alkali metal hydroxides include lithium hydroxide, sodium hydroxide, and potassium hydroxide.

Examples of ammonium hydroxides include ammonium hydroxide, and quaternary ammonium hydroxide. Examples of phosphonium hydroxide include quaternary phosphonium hydroxide.

Examples of alkali metal carbonates include lithium carbonate, sodium carbonate, and potassium carbonate.

Examples of the anti-rust agent include acid sulfite, sodium thiosulfate, ammonium thioglycolate, diisopropyl ammonium nitrite, pentaerythritol tetranitrate, and dicyclohexyl ammonium nitrite.

An ink cartridge contains a container, and the aforementioned aqueous ink housed in the container, and may further contain other members, if necessary.

Regarding the container, the shape, structure, size, and material thereof are suitably selected depending on the intended purpose without any restriction. Examples thereof include: a plastic container; and an ink bag formed of a aluminum laminate film, resin film, or the like.

Specific examples thereof include those having the similar structure to that of the ink cartridge shown in FIGS. 5 and 6, which will be explained later.

An image forming device contains an image forming unit for forming an image on a surface of a recording medium by an ink jetting recording system, and a pretreatment unit. Moreover, the image-forming unit contains at least an ink-jetting unit, and may contain other members such as a stimulation generating unit, a control unit, and the like, if necessary.

FIG. 1 is a schematic diagram (a side plane explanatory diagram) showing an example of the image forming device.

The image forming device 101 is equipped with head units 110K, 110C, 110M, and 110Y each integrating a head for jetting an ink, maintenance units 111K, 111C, 111M, and 111Y, respectively corresponding to each head unit, ink cartridges 107K, 107C, 107M, and 107Y for supplying an ink, and sub ink tanks 108K, 108C, 108M, and 108Y each storing part of the ink from the respective cartridge and supplying the ink to the respective head with appropriate pressure.

The image forming device 101 further contains: a conveyance belt 113 for conveying a recording medium 114 by sticking the recording medium 114 thereon; conveying rollers 119, and 121 for supporting the conveyance belt 113; a tension roller 115 for controlling that the conveyance belt 113 maintains an appropriate tension; a platen 124 used so that the conveyance belt 113 maintains an appropriate flatness; a charging roller 116 for applying electrostatic charge for sticking the recording medium 114; a discharging roller 117 for pressing the recording medium 114; a paper discharging mechanism composed of a discharging tray 104 for storing the discharged recording media 114; a paper feeding tray 103 for storing the recording media 114 to be printed: a separation pad 112 for sending the recording media 114 one by one from the paper feeding tray; a counter roller 123 for surely sticking the sent recording medium 114 to the charging belt; and a paper feeding mechanism composed of a manual bypass tray 105 used when a paper is manually fed.

Furthermore, the image forming device 101 is also equipped with a discharged liquid tank 109 for collecting waste liquid discharged after maintenance, and a control panel 106 capable of operating the device and displaying the state of the device.

A nozzle array of each head unit is aligned so as to be orthogonal to the conveyance direction of the recording medium 114, and is formed so as to be longer than a length of a recording region. The recording media 114 stored in the paper feeding tray are separated into one piece by a separation roller, and the separated recording medium 114 is fixed onto the conveyance belt by being pressed on the conveyance belt by a pressurize roller. When the recording medium 114 is passed under the head unit, the recording medium 114 is patterned with droplets at high speed by jetting droplets to the recording medium 114. The recording medium 114 is then separated from the conveyance belt by a separation craw, and discharged as a recorded matter into a paper-discharging tray by a discharging roller and another discharging roller.

To this device, a coating system is provided as a system for treating a surface of a recording medium with a pretreatment liquid, and uses roller coating. The pretreatment liquid 135 is taken out to a surface of a roller by a fountain roller 137, and is transferred to a film thickness controlling roller 138. The pretreatment liquid then transferred to an application roller 136 is transferred and applied to the recording medium 114 which is passed between the application roller 136 and a counter roller for application 139.

An amount of the pretreatment liquid transferred to the application roller 136 is controlled by adjusting nip with the application roller 136. When an application of the pretreatment liquid is not desirable, the pretreatment liquid present on a surface of the application roller can be scraped by pressurizing a movable blade 134 against the application roller 136 so as not to leave the pretreatment liquid on the application roller 136. In this manner, functional disorders caused by the remained pretreatment liquid on the application roller 136 (e.g. increased viscosity due to the dried pretreatment liquid, bonding to the counter roller for application 139, and uneven application) can be prevented in advance.

Moreover, in the case where it is not necessary to apply the pretreatment liquid, a paper can be fed from a paper feeding tray 103A which does not have a pretreatment system. In the case where it is necessary to apply the pretreatment liquid, on the other hand, a paper can be fed from a paper feeding tray 103B which has a pretreatment system. In these cases, the paper feeding tray for use can be selected by the control panel (not shown), and then printing is carried out.

Other than the aforementioned roller coating, the pretreatment liquid can also be spray-coated by an inkjet system. For example, the pretreatment liquid is charged in a head having the similar configuration to that of 110k, and then jetted to a recording medium 114 in the same manner as when the ink is jetted. The control of the jetting amount or position can be easily and accurately controlled by this system.

Whichever system is used, the pretreatment liquid can be applied to a desired location in a desired amount.

Figure 3:
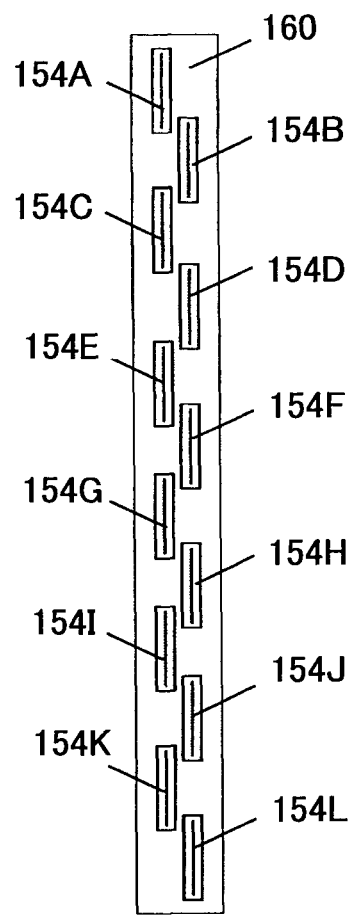
FIG. 3 is a schematic diagram illustrating one example of a head array in a heat unit of the image forming device of FIG. 1.

FIG. 3 is a schematic diagram showing one example of the head array in the head unit of the aforementioned image forming device.

The head unit contains heads 154A to 154L fixed on a head circumferential member 160, and the heads are fixed with a staggered arrangement so that the heads overlap with part of nozzle.

Figure 4:
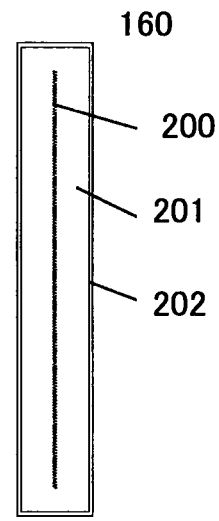
FIG. 4 is a schematic diagram illustrating an enlarged view of the head aligned in the head unit of FIG. 3.

FIG. 4 is a schematic diagram showing the enlarged heads aligned in the head unit of FIG. 3. Each head has a nozzle 200 which is two arrays of openings provided in a nozzle plate 201 in a staggered arrangement. The head and the heat circumferential member are sealed with a filler 202 to remove any space on the nozzle surface.

Figure 2:
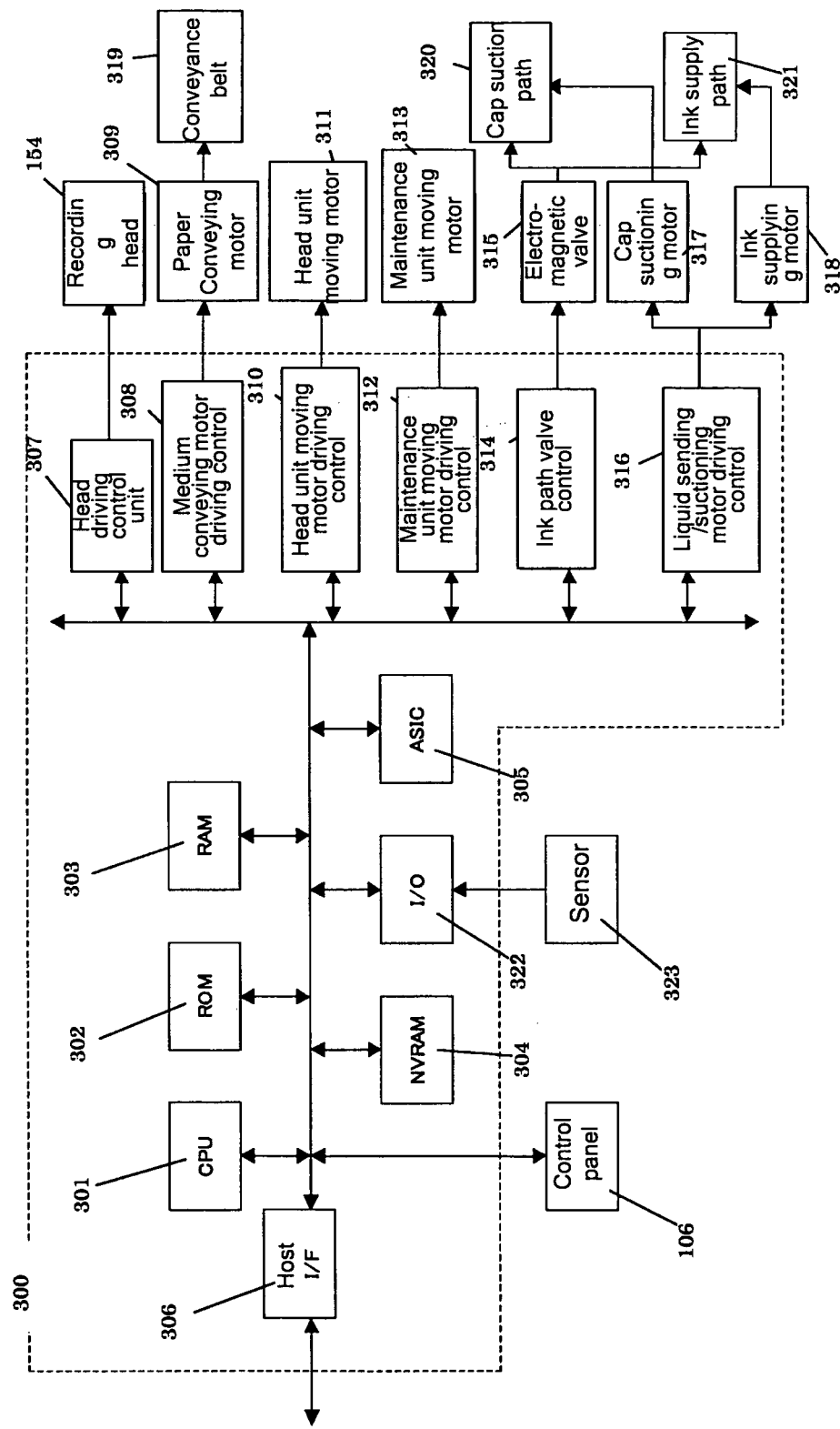
FIG. 2 is a schematic block explanatory diagram illustrating a control unit used in the image forming device of FIG. 1.

An outline of the control unit of the image forming device shown in FIG. 1 will be explained with reference to FIG. 2 hereinafter. Note that, FIG. 2 is a schematic block explanatory diagram of the control unit.

The control unit 300 contains: CPU 301 for controlling the entire device; ROM 302 for storing a program CPU 301 operates, and fixed date such as a value for a contamination degree of a nozzle surface relative to an ejection of the ink for use, a threshold value for a contamination degree of a nozzle surface, data for a driving wave, and other fixed data; RAM 303 for temporarily storing image data and the like; a non-volatile memory (NVRAM) 304 for keeping data while a power source of the device is shut out; and ASIC 305 for processing input/output signals, such as various signals for the image date, image processing for replacing positions of images, and other input/output signals for controlling the entire device.

Moreover, the control unit 300 contains: a host I/F 306 for sending and receiving data and signals to and from a host; a heat drive controlling unit 307 for generating a drive wave for driving and controlling a pressure generating unit of the recording head 154; a recording medium conveying motor driving unit 308 for driving a recording medium (paper) conveying motor 309; a holding unit moving motor drive controlling unit 312 for driving a head unit (carriage) moving motor 311; an ink channel valve controlling unit 314 for controlling opening and closing of an electromagnetic valve 315 of an ink channel; a delivery/suction motor drive controlling unit 316 for controlling driving of a cap suction motor 317 or ink supplying motor 318; and I/O 322 for inputting detecting signals from a encoder which output a detecting signal corresponding to a traveling amount and speed of the conveyance belt 113, or from a sensor 323 for detecting temperature and humidity environment (or can be either of them), and inputting detecting signals from various sensors not shown in the diagram. The control unit 300 is connected to the control panel 106 to or onto which information necessary to the device is input and displayed.

The control unit 300 receives at the host I/F 306 image data and the like from a host via a cable or net, and in this case the host is such as an image processor (e.g. a personal computer), an image scanning device (e.g. an image scanner), and an imaging device (e.g. a digital camera).

CPU 301 reads out printing date into a receiving buffer contained in the host I/F 306 and analyzes the data, optionally makes the data to image processed or repositioned by ASIC 305, synchronizes the image data (i.e. dot pattern data) which equivalent of one page for a head width of the recording head 154 to a clock signal, and output the signal to the heat drive controlling unit 307. Then, CPU 301 reads out printing data in the receiving buffer contained in the host I/F 306 and analyzes it. After carrying out necessary image processing or repositioning of the data by ASIC 305, the image data is output to the head drive controlling unit 307. Note that, the formation of the dot pattern data for image output may be stored as font data in ROM 302. Alternatively, the image data may be expanded to bit map data by a print driver at the host side, and the bit map data may be output to the device.

The head drive controlling unit 307 selectively applies voltage to the pressure generating unit of the recording head 154 based on the image date (i.e. the dot pattern data) for one page of the recording head 154 input per page, and drives the recording head 154.

Although it is not shown in the diagram, in the case where the pretreatment liquid is coated by a roller, a control unit of a motor for application, a motor to be controlled, and a sensor for controlling are included in the device, as it is necessary to control driving of a group of rollers for application, such as an application roller.

Furthermore, in the case where the pretreatment liquid is applied by inkjet, there is a possibility to cause nozzle clogging due to mixing with other colors, unless the maintenance operation is performed in a different manner from that of the other inks. Therefore, it is desirable that a maintenance unit moving motor is provided for the pretreatment liquid, separately from that for the ink.

The ink cartridge will be explained with reference to FIGS. 5 and 6 hereinafter. FIG. 5 is a diagram showing one example of the ink cartridge, and FIG. 6 is a diagram showing a case (housing) of the ink cartridge of FIG. 5 as well as the ink cartridge itself.

Figure 5:
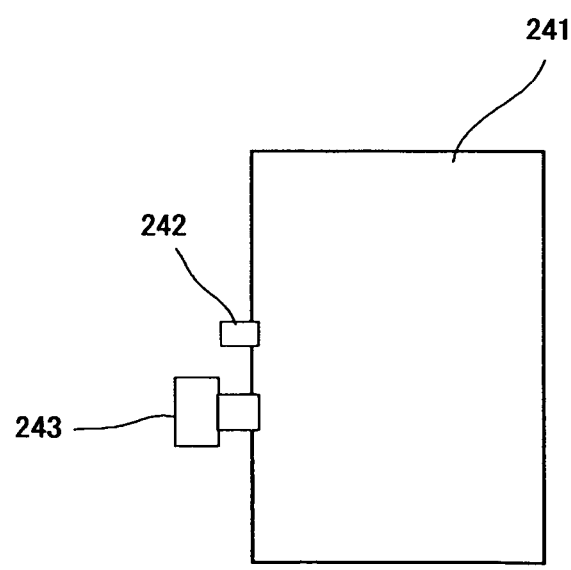
FIG. 5 is a diagram illustrating one example of an ink cartridge of the present invention.
Figure 6:
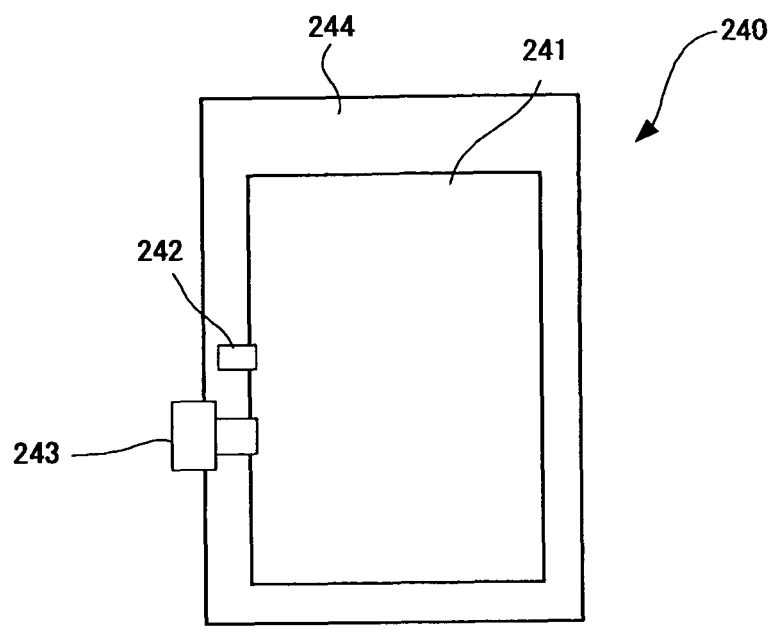
FIG. 6 is a diagram illustrating the view of the ink cartridge of FIG. 5 including a casing.

As shown in FIG. 5, the ink is introduced into an ink bag 241 from an ink inlet 242. After removing the inner gas from the ink bag, the ink inlet 242 is closed by fusing. When the ink cartridge is used, the ink cartridge is set in the device by inserting a needle equipped with the body of the device into an ink outlet 243 formed of a rubber member to supply the ink to the device. The ink bag 241 is formed of an airtight wrapping member such as an aluminum laminate film. As shown in FIG. 6, this ink bag 241 is accommodated in the cartridge case 244 generally formed of a plastic, and as the ink cartridge 240, it is detachably mounted to various image forming devices.

Moreover, the pretreatment liquid is placed in the aforementioned ink cartridge 240, instead of the ink, and the cartridge can be used as a cartridge for the pretreatment liquid. In this case, the cartridge can be also detachably mounted to various image forming devices, similar to the ink cartridge,

EXAMPLES

The present invention will be more specifically explained through synthesis examples, examples and comparative examples hereinafter, but these examples shall not be construed as to limit the scope of the present invention.

Synthesis Example 1

After sufficiently replacing an inner atmosphere of a 1 L flask equipped with a stirrer, thermometer, nitrogen-gas inlet tube, reflux tube and dropping funnel with a nitrogen gas, 11.2 g of styrene, 2.8 g of acrylic acid, 12.0 g of lauryl methacrylate, 4.0 g of polyethylene glycol methacrylate, 4.0 g of styrene macromer (styrene high molecular weight monomer, AS-6, manufactured by Toagosei Co., Ltd.), and 0.4 g of mercapto ethanol were added, and heated at 65° C. To the flask, a mixed solution containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (AS-6, manufactured by Toagosei Co., Ltd.), 3.6 g of mercapto ethanol, 2.4 g of azobismethyl valeronitrile and 18 g of methylethyl ketone was dropped over 2.5 hours. After the completion of dropping, a mixed solution containing 0.8 g of azobisdimethyl valeronitrile, and 18 g of methylethyl ketone was dropped into the flask over 0.5 hours. The mixture was matured at 65° C. for 1 hour, and then 0.8 g of azobisdimethyl valeronitrile was added thereto, followed by further allowing the mixture to mature for 1 hour. After the completion of the reaction, 364 g of methylethyl ketone was added to the flask, to thereby obtain 800 g of a polymer solution having a concentration of 50%.

Synthesis Example 2

An automatic polymerization reaction device (Polymerization Tester DSL-2AS, manufactured by Todoroki Sangyo Co., Ltd.) having a reaction vessel which was equipped with a stirrer, dropping device, temperature sensor, and reflux device having a nitrogen introduction device at the upper part thereof was used. Into the reaction vessel, 550 g of methylethyl ketone was charged, and the inner atmosphere of the reaction vessel was replaced with nitrogen gas while stirring. The fluid inside the reaction vessel was heated at 80° C. with the inner atmosphere therein kept to the nitrogen atmosphere, and then into the reaction vessel a mixed solution containing 75.0 g of 2-hydroxyethyl methacrylate, 77.0 g of methacrylic acid, 80.0 g of styrene, 150.0 g of butyl methacrylate, 98.0 g of butyl acrylate, 20.0 g of methyl methacrylate, and 40.0 g of "PERBUTYL O" (manufactured by NOF Corporation) was dropped by means of the dropping device for 4 hours. After the completion of dropping, the mixture was allowed to react for 15 hours at the same temperature, to thereby obtain a methylethyl ketone solution of anionic group-containing styrene-acryl copolymer A having an acid value of 100, weight average molecular weight of 21,000, and Tg (calculated value) of 31° C. After the completion of the reaction, part of methylethyl ketone was removed under reduced pressure, to thereby obtain a copolymer A solution whose nonvolatile substances were adjusted to 50%.

Preparation Example 1

After sufficiently stirring 28 g of the polymer solution prepared by Synthesis Example 1, 26 g of C.I. Pigment Red 122, 13.6 g of 1 mol/L potassium hydroxide solution, 20 g of methylethyl ketone, and 30 g of ion-exchanged water, the mixture was kneaded by a three-roll mill to obtain a paste. The paste was added to 200 g of ion-exchanged water, and the mixture was sufficiently stirred. Then, methylethyl ketone and water was removed from the mixture by means of an evaporator, to thereby obtain an aqueous dispersion liquid of water-insoluble vinyl polymer particles having a solid content of 20% by mass.

Preparation Example 2

Into 3 L of a 2 mol/L sodium persulfate solution, 150 g of C.I. Pigment Red 122 was added, and the mixture was subjected to an oxidization process by stirring for 10 hours at 60° C. The oxidized C.I. Pigment Red 122 was then subjected to ultrafiltration to remove the remaining salts (excess Na), thereafter, a sodium hydroxide solution was added thereof to adjust the pH value thereof to 8, and ultrafiltration was carried out to remove excess salts. To the thus obtained solution, purified water was added so that the solid content thereof was to be 20% by mass. The dispersed elements contained in the dispersion liquid obtained in the aforementioned manner had the volume average particle diameter of 127 nm.

Preparation Example 3

Into a mixing chamber equipped with a cooling jacket, 1,000 g of C.I. Pigment Red 122, 800 g of the copolymer A solution prepared in Synthesis Example 2, 143 g of a 20% sodium hydroxide solution, 100 g of methylethyl ketone, and 1,957 g of water were charged, and the mixture was mixed by stirring. The mixed solution was dispersed in a circulated system (i.e. a system where a dispersion liquid discharged from a disperser was returned to the mixing chamber) for 6 hours by passing the mixed solution through a disperser (SC Mill SC100, manufactured by Nippon Cole & Engineering Co., Ltd.) filled with zirconium beads each having a diameter of 0.3 mm. Here, the revolution of the disperser was 2,700 rpm, and cold water was introduced to the cooling jacket so that the temperature of the dispersion liquid was kept 40° C. or lower. After the completion of the dispersion, the dispersion liquid was taken out from the mixing chamber, followed by washing the mixing chamber and flow channel of the disperser with 10,000 g of water, to thereby obtain the diluted dispersion liquid as well as the dispersion liquid. The diluted dispersion liquid was poured into an evaporator made of glass to remove the entire methylethyl ketone and part of water. The resulted solution was cooled down to room temperature, and the pH value thereof was adjusted to 4.5 by dropping 10% hydrochloric acid. Thereafter, the solid contents thereof were filtered through Nutsche filter, followed by washing with water. The thus obtained cake was placed in a container, and 200 g of a 20% potassium hydroxide solution was added thereto. The mixture was then dispersed by a disperser (TK Homo Disperser, manufactured by PRIMIX Corporation), and water was added thereto to adjust the proportion of the nonvolatile components thereof, to thereby obtain an aqueous pigment dispersion liquid (Yellow Dispersion Liquid) in which composite particles were dispersed in an aqueous medium. Here, the composite particles were such that C.I. Pigment Red 122 having 20% of the nonvolatile substances was coated with the carboxyl-group-containing styrene-acryl copolymer that was neutralized in potassium hydroxide.

Preparation Example 4

Black polymer particles were prepared in the same manner as in Preparation Example 1, provided that C.I. Pigment Red 122 was replaced with carbon black. The obtained dispersion liquid (Black Dispersion Liquid) included dispersed particles having a volume average particle diameter of 70 nm.

Preparation Example 5

Blue polymer particles were prepared in the same manner as in Preparation Example 1, provided that C.I. Pigment Red 122 was replaced with a cupper phthalocyanine pigment. The obtained dispersion liquid (Cyan Dispersion Liquid) included dispersed particles having a volume average particle diameter of 93 nm.

Preparation Example 6

Yellow polymer particles were prepared in the same manner as in Preparation Example 1, provided that C.I. Pigment Red 122 was replaced with C.I. Pigment Yellow 74. The obtained dispersion liquid (Magenta Dispersion Liquid) included dispersed particles having a volume average particle diameter of 76 nm.

Preparation Example 7

The aqueous pigment dispersion liquids obtained in Preparation Examples 3 to 6 were each mixed with a wetting agent, water and the like in the proportions shown in the tables below, and the mixture was filtered through a membrane filter having an average pore diameter of 0.8 μm to thereby prepare an aqueous ink. Various properties of the obtained aqueous ink were evaluated in the following manners. Note that, the aqueous pigment dispersion liquid was mixed in the proportion such that the solid content thereof was to be 10%.

<Static Surface Tension>

Aqueous inks prepared by mixing substances based upon the formulation shown in Comparative Examples and Examples, respectively were subjected to the measurement of a static surface tension by means of a full automatic surface tensiometer (CBVP-Z, manufactured by Kyowa Interface Science Co, Ltd.).

<Image Density>

Aqueous inks prepared by mixing substances based upon the formulation shown in Comparative Examples and Examples, respectively were each jetted from an inkjet printer (GX5000, manufactured by Ricoh Company Limited) based on a predetermined image to obtain a sample print. A solid image portion of the sample print was measured by a spectradensitometer (939, manufactured by X-Rite Inc.).

<Foaming>

Aqueous inks prepared by mixing substances based upon the formulation shown in Comparative Examples and Examples, respectively were each placed in a 100 mL measuring cylinder in an amount of 10 mL, and left to stand for 24 hours. Then the measuring cylinder was placed in a constant temperature water bath having the temperature of 10° C. for over 30 minutes to adjust the temperature of the ink. After the temperature of the ink was sufficiently adjusted to the water temperature, air was blown in by a syringe to bubble the ink up to 100 mL. The height of the bubbles was visually confirmed in 60 seconds time, 300 seconds time, and 600 seconds time.

<Raw Materials for Use>

Glycerin: manufactured by Sakamoto Yakuhin Kogyo Co., Ltd.

1,3-Butylene glycol: manufactured by Kanto Chemical Co., Inc.

FS-300: Zonyl FS-300, manufactured by Du Pont Kabushiki Kaisha (active ingredient: 40% by mass) ((A) a fluorosurfactant)

(Structural formula of FS-300)

$CF_3CF_2(CF_2CF_2)_m$—$CH_2CH_2O(CH_2CH_2O)_nH$

TF-2066: MEGAFACE TF-2066, manufactured by DIC Corporation ((A) a fluorosurfactant)

DSN-403N: UNIDYNE DSN-403N, manufactured by Daikin Industries, Ltd. ((A) a fluorosurfactant)

(Structural formula of DSN-403N)

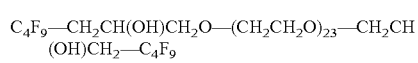

$C_4F_9$—$CH_2CH(OH)CH_2O$—$(CH_2CH_2O)_{23}$—$CH_2CH(OH)CH_2$—$C_4F_9$

LP-100: SURFADONE LP-100 (N-Octyl-2-Pyrrolidone), manufactured by ISP Japan Ltd.

1,2-Octanediol: manufactured by Kanto Chemical Co., Inc.

KM-72F: manufactured by Shin-Etsu Chemical Co., Ltd.

2-Amino-2-ethyl-1,3-propanediol: manufactured by Tokyo Chemical Industry Co., Ltd.

LV(S): manufactured by Avecua K.K.

LP-300: SURFADONE LP-300 (N-Dodecyl-2-Pyrrolidone), manufactured by ISP Japan Ltd.

Tables 3-1 and 3-2 show experimental examples for confirming the solubility of N-alkyl-2-pyrrolidone depending on the length of the alkyl chain thereof. Each substance was mixed, stirred for 30 minutes, and then the solubility thereof was visually observed, and evaluated as A or B where A was good, and B was not good.

Note that, in the following Tables 1-1 through 3-2, units for the formulation section are all % by mass.

TABLE 1-1

| | | Comp. Ex. 1 | Comp. Ex. 2 | Comp. Ex. 3 | Comp. Ex. 4 | Comp. Ex. 5 |
|---|---|---|---|---|---|---|
| Pigment dispersion liquid | Black dispersion | 50 | | | | |
| | Cyan dispersion | | 50 | | | |
| | Magenta dispersion | | | | 50 | 50 |
| | Yellow dispersion | | | 50 | | |
| Wetting agent | Glycerin | 17 | 23 | 18 | 8 | 8 |
| | 1,3-butylene glycol | 10 | 11 | 18 | 23 | 23 |
| Surfactant | FS-300 (substance: 40 mass %) | 2.5 | 2.5 | 2.5 | 2.5 | |
| | TF-2066 | | | | | |
| | DSN-403N | | | | | 0.5 |
| | LP-100 | | | | | |
| Penetrating agent | 1,2-octanediol | 2 | 2 | 2 | 2 | 2 |
| Defoaming agent | KM-72F | 0.1 | 0.1 | 0.1 | 0.1 | 0.1 |
| pH regulator | 2-amino-2-ethyl-1,3-propanediol | 0.5 | 0.5 | 0.5 | 0.5 | 0.5 |
| Antifungal agent | LV (S) | 0.1 | 0.1 | 0.1 | 0.1 | 0.1 |
| Water | Highly pure water | 17.8 | 10.8 | 8.8 | 13.8 | 15.8 |
| Total | | 100 | 100 | 100 | 100 | 100 |
| Static surface tension [mN/m] | | 25.3 | 24.8 | 24.4 | 24.9 | 18.2 |
| Image density | | 1.212 | 1.061 | 0.834 | 0.936 | 0.965 |
| Height of bubbles after 60 sec. [mL] | | 90 | 90 | 90 | 90 | 90 |
| Height of bubbles after 300 sec [mL] | | 35 | 85 | 25 | 60 | 90 |
| Height of bubbles after 600 sec. [mL] | | 10 | 20 | 10 | 10 | 90 |

TABLE 1-2

| | | Comp. Ex. 6 | Comp. Ex. 7 | Comp. Ex. 8 | Comp. Ex. 9 |
|---|---|---|---|---|---|
| Pigment dispersion liquid | Black dispersion | | | | |
| | Cyan dispersion | | | | |
| | Magenta dispersion | 50 | 50 | 50 | 50 |
| | Yellow dispersion | | | | |

TABLE 1-2-continued

| | | Comp. Ex. 6 | Comp. Ex. 7 | Comp. Ex. 8 | Comp. Ex. 9 |
|---|---|---|---|---|---|
| Wetting agent | Glycerin | 8 | 8 | 8 | 8 |
| | 1,3-butylene glycol | 23 | 23 | 23 | 23 |
| Surfactant | FS-300 (substance: 40 mass %) | | | | |
| | TF-2066 | | 0.5 | | |
| | DSN-403N | | | 0.09 | 0.3 |
| | LP-300 | | | 0.21 | 0.7 |
| | LP-100 | 0.2 | | | |
| Penetrating agent | 1,2-octanediol | 2 | 2 | 2 | 2 |
| Defoaming agent | KM-72F | 0.1 | | | |
| pH regulator | 2-amino-2-ethyl-1,3-propanediol | 0.5 | 0.5 | 0.5 | 0.5 |
| Antifungal agent | LV (S) | 0.1 | 0.1 | 0.1 | 0.1 |
| Water | Highly pure water | 16.1 | 15.9 | 16.1 | 15.4 |
| Total | | 100 | 100 | 100 | 100 |
| Static surface tension [mN/m] | | 34.8 | 18.9 | 20.1 | 20.3 |
| Image density | | 0.933 | 0.959 | 0.961 | 0.956 |
| Height of bubbles after 60 sec. [mL] | | 0 | 90 | 90 | 90 |
| Height of bubbles after 300 sec [mL] | | 0 | 90 | 90 | 90 |
| Height of bubbles after 600 sec. [mL] | | 0 | 90 | 90 | 90 |

TABLE 2-1

| | | Ex. 1 | Ex. 2 | Ex. 3 | Ex. 4 | Ex. 5 | Ex. 6 |
|---|---|---|---|---|---|---|---|
| Pigment dispersion liquid | Black dispersion | 50 | | | | | |
| | Cyan dispersion | | 50 | | | | |
| | Magenta dispersion | | | | 50 | 50 | 50 |
| | Yellow dispersion | | | 50 | | | |
| Wetting agent | Glycerin | 17 | 23 | 18 | 8 | 8 | 8 |
| | 1,3-Butylene glycol | 10 | 11 | 18 | 23 | 23 | 23 |
| Surfactant | FS-300 (substance: 40 mass %) | | | | | | |
| | TF-2066 | | | | | | |
| | DSN-403N | 0.3 | 0.3 | 0.3 | 0.06 | 0.09 | 0.1 |
| | LP-100 | 0.7 | 0.7 | 0.7 | 0.24 | 0.21 | 0.4 |
| Penetrating agent | 1,2-octanediol | 2 | 2 | 2 | 2 | 2 | 2 |
| Defoaming agent | KM-72F | | | | | | |
| pH regulator | 2-amino-2-ethyl-1,3-propanediol | 0.5 | 0.5 | 0.5 | 0.5 | 0.5 | 0.5 |
| Antifungal agent | LV (S) | 0.1 | 0.1 | 0.1 | 0.1 | 0.1 | 0.1 |
| Water | Highly pure water | 19.4 | 12.4 | 10.4 | 16.1 | 16.1 | 15.9 |
| Total | | 100 | 100 | 100 | 100 | 100 | 100 |
| Static surface tension [mN/m] | | 19.5 | 19.8 | 19.5 | 21.9 | 19.6 | 19.5 |
| Image density | | 1.228 | 1.084 | 0.861 | 0.956 | 0.960 | 0.960 |
| Bubble height after 60 sec. [mL] | | 0 | 0 | 0 | 0 | 0 | 0 |
| Bubble height after 300 sec. [mL] | | 0 | 0 | 0 | 0 | 0 | 0 |
| Bubble height after 600 sec. [mL] | | 0 | 0 | 0 | 0 | 0 | 0 |

TABLE 2-2

| | | Ex. 7 | Ex. 8 | Ex. 9 | Ex. 10 | Ex. 11 |
|---|---|---|---|---|---|---|
| Pigment dispersion liquid | Black dispersion | | | | | |
| | Cyan dispersion | | | | | |
| | Magenta dispersion | 50 | 50 | 50 | 50 | 50 |
| | Yellow dispersion | | | | | |
| Wetting agent | Glycerin | 8 | 8 | 8 | 8 | 8 |
| | 1,3-Butylene glycol | 23 | 23 | 23 | 23 | 23 |
| Surfactant | FS-300 (substance: 40 mass %) | | | | 0.03 | |
| | TF-2066 | | | | | 0.1 |
| | DSN-403N | 0.15 | 0.2 | 0.3 | | |
| | LP-100 | 0.35 | 0.8 | 0.7 | 0.27 | 0.4 |
| Penetrating agent | 1,2-octanediol | 2 | 2 | 2 | 2 | 2 |
| Defoaming agent | KM-72F | | | | | |
| pH regulator | 2-amino-2-ethyl-1,3-propanediol | 0.5 | 0.5 | 0.5 | 0.5 | 0.5 |
| Antifungal agent | LV (S) | 0.1 | 0.1 | 0.1 | 0.1 | 0.1 |
| Water | Highly pure water | 15.9 | 15.4 | 15.4 | 16.1 | 15.9 |
| Total | | 100 | 100 | 100 | 100 | 100 |

TABLE 2-2-continued

|  | Ex. 7 | Ex. 8 | Ex. 9 | Ex. 10 | Ex. 11 |
|---|---|---|---|---|---|
| Static surface tension [mN/m] | 19.1 | 18.9 | 18.8 | 28.9 | 20.8 |
| Image density | 0.959 | 0.959 | 0.962 | 0.948 | 0.957 |
| Bubble height after 60 sec. [mL] | 0 | 0 | 0 | 0 | 0 |
| Bubble height after 300 sec. [mL] | 0 | 0 | 0 | 0 | 0 |
| Bubble height after 600 sec. [mL] | 0 | 0 | 0 | 0 | 0 |

TABLE 2-3

|  |  | Ex. 12 | Ex. 13 | Ex. 14 |
|---|---|---|---|---|
| Pigment dispersion liquid | Black dispersion | | | |
| | Cyan dispersion | | | |
| | Magenta dispersion | 50 | 50 | 50 |
| | Yellow dispersion | | | |
| Wetting agent | Glycerin | 8 | 8 | 8 |
| | 1,3-Butylene glycol | 23 | 23 | 23 |
| Surfactant | FS-300 (substance: 40 mass %) | | | |
| | TF-2066 | | | |
| | DSN-403N | 0.02 | 0.1 | 0.45 |
| | LP-100 | 0.08 | 0.2 | 1.05 |
| Penetrating agent | 1,2-octanediol | 2 | 2 | 2 |
| Defoaming agent | KM-72F | | | |
| pH regulator | 2-amino-2-ethyl-1,3-propanediol | 0.5 | 0.5 | 0.5 |
| Antifungal agent | LV (S) | 0.1 | 0.1 | 0.1 |
| Water | Highly pure water | 16.3 | 16.1 | 14.9 |
| Total | | 100 | 100 | 100 |
| Static surface tension [mN/m] | | 22.5 | 18.9 | 18.7 |
| Image density | | 0.951 | 0.957 | 0.955 |
| Bubble height after 60 sec. [mL] | | 0 | 30 | 20 |
| Bubble height after 300 sec. [mL] | | 0 | 10 | 0 |
| Bubble height after 600 sec. [mL] | | 0 | 0 | 0 |

TABLE 3-1

|  |  | Exp. Ex. 1 | Exp. Ex. 2 | Exp. Ex. 3 | Exp. Ex. 4 | Exp. Ex. 5 | Exp. Ex. 6 |
|---|---|---|---|---|---|---|---|
| Wetting agent | Glycerin | 8 | 8 | 8 | 8 | 8 | 8 |
| | 1,3-butylene glycol | 23 | 23 | 23 | 23 | 23 | 23 |
| Surfactant | LP-100 | | | | | | |
| | LP-300 | 0.01 | 0.05 | 0.1 | 0.3 | 0.5 | 1.0 |
| Water | Highly pure water | 68.99 | 68.95 | 68.9 | 68.7 | 68.5 | 68 |
| Total | | 100 | 100 | 100 | 100 | 100 | 100 |
| Static surface tension [mN/m] | | 27.2 | 27.2 | 27.4 | 26.9 | 26.8 | 27.1 |
| Solubility of surfactant | | B | B | B | B | B | B |

TABLE 3-2

|  |  | Exp. Ex. 7 | Exp. Ex. 8 | Exp. Ex. 9 | Exp. Ex. 10 | Exp. Ex. 11 | Exp. Ex. 12 |
|---|---|---|---|---|---|---|---|
| Wetting agent | Glycerin | 8 | 8 | 8 | 8 | 8 | 8 |
| | 1,3-butylene glycol | 23 | 23 | 23 | 23 | 23 | 23 |

TABLE 3-2-continued

|  |  | Exp. Ex. 7 | Exp. Ex. 8 | Exp. Ex. 9 | Exp. Ex. 10 | Exp. Ex. 11 | Exp. Ex. 12 |
|---|---|---|---|---|---|---|---|
| Surfactant | LP-100 | 0.01 | 0.05 | 0.1 | 0.3 | 0.5 | 1.0 |
| | LP-300 | | | | | | |
| Water | Highly pure water | 68.99 | 68.95 | 68.9 | 68.7 | 68.5 | 68 |
| Total | | 100 | 100 | 100 | 100 | 100 | 100 |
| Static surface tension [mN/m] | | 44.5 | 32.9 | 23.3 | 29.7 | 29.2 | 29.1 |
| Solubility of surfactant | | A | A | A | A | A | A |

Note that, in Tables 3-1 and 3-2, "LP-100" means SURFADONE LP-100 (N-Octyl-2-Pyrrolidone) manufactured by ISP Japan Ltd., and "LP-300" means SURFADONE LP-300 (N-Dodecyl-2-Pyrrolidone) manufactured by ISP Japan Ltd.

As seen from Comparative Examples 5 to 6 and Examples 4 to 9, it was clear that the foaming of the ink was significantly reduced, the surface tension of the ink was kept low, and the image having high image density could be obtained by using the fluorosurfactant (e.g. DSN-403N (product name)) and N-octyl-2-pyrrolidone (e.g. LP-100 (product name)) in combination. Since a fluorosurfactant which would enhance coloring ability was not added to Comparative Example 6, the image density was low, the static surface tension was high, and the penetration ability (which would contribute to abrasion resistance) to the recording medium was not desirable.

Moreover, as clearly seen from Examples 4 to 9, the foaming of the ink could be significantly reduced by keeping the proportion of the fluorosurfactant (DSN-403N) 30% by mass or less relative to the combined amount of the fluorosurfactant (DSN-403N) and N-octyl-2-pyrrolidone (LP-100). Furthermore, as clearly seen from Examples 4 to 9, the foaming of the ink could be significantly reduced by keeping the combined amount of the fluorosurfactant (DSN-403N) and N-octyl-2-pyrrolidone (LP-100) 1% by mass or less relative to total amount of the aqueous ink.

| Reference Signs List | |
|---|---|
| 101 | Image forming device |
| 103 | Paper feeding tray |
| 103A | Paper feeding tray |
| 103B | Paper feeding tray |
| 104 | Paper discharging tray |
| 105 | Manual bypass tray |
| 106 | Control panel |
| 107K | Ink cartridge |
| 107C | Ink cartridge |
| 107M | Ink cartridge |
| 107Y | Ink cartridge |
| 108K | Sub ink tank |
| 108C | Sub ink tank |
| 108M | Sub ink tank |
| 108Y | Sub ink tank |
| 109 | Discharging tank |
| 110K | Head unit |
| 110C | Head unit |
| 110M | Head unit |
| 110Y | Head unit |
| 111K | Maintenance unit |
| 111C | Maintenance unit |
| 111M | Maintenance unit |
| 111Y | Maintenance unit |
| 112 | Separation pad |
| 113 | Conveyance belt |
| 114 | Recording medium |
| 115 | Tension roller |
| 116 | Charging roller |

-continued

| Reference Signs List | |
|---|---|
| 117 | Discharging roller |
| 118 | Platen roller |
| 119 | Conveying roller |
| 120 | Suction fan |
| 121 | Conveying roller |
| 122 | Separation pad |
| 123 | Counter roller |
| 124 | Platen |
| 134 | Movable blade |
| 135 | Pretreatment liquid |
| 136 | Application roller |
| 137 | Fountain roller |
| 138 | Film thickness controlling roller |
| 139 | Counter roller for application |
| 140 | Pretreatment liquid tank |
| 160 | Head circumferential member |
| 154A~154L | Head |
| 200 | Nozzle |
| 201 | Nozzle plate |
| 202 | Filler |
| 240 | Ink cartridge |
| 241 | Ink bag |
| 242 | Ink inlet |
| 243 | Ink outlet |
| 244 | Cartridge case |

The invention claimed is:

1. An aqueous ink comprising water and:
(A) a fluorosurfactant having a formula 2:

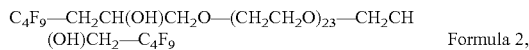

Formula 2, and
(B) N-alkyl-2-pyrrolidone wherein the N-alkyl-2-pyrrolidone is N-octyl-2-pyrrolidone,
wherein the fluorosurfactant is present in an amount of 30% or less by mass, based on the combined mass of the fluorosurfactant and the N-octyl-2-pyrrolidone.

2. The ink of claim 1, comprising 20% or less by mass of the fluorosurfactant, based on the combined mass of the fluorosurfactant and the N-alkyl-2-pyrrolidone.

3. The ink of claim 1, wherein the combined mass of the fluorosurfactant and the N-alkyl-2-pyrrolidone in the ink is 1% or less by mass, based on the total mass of the ink.

4. The ink of claim 3, wherein the combined mass of the fluorosurfactant and the N-alkyl-2-pyrrolidone in the ink is 0.1% by mass to 1% by mass, based on the total mass of the ink.

5. The ink of claim 4, wherein the combined mass of the fluorosurfactant and the N-alkyl-2-pyrrolidone in the aqueous ink is 0.3% by mass to 0.5% by mass, based on the total mass of the ink.

6. The ink of claim 1, further comprising a coloring agent.

7. The ink of claim 6, wherein the coloring agent comprises inorganic particles coated with an organic pigment or carbon black.

8. The ink of claim 6, wherein the coloring agent is a pigment covered with a carboxyl-group containing resin.

9. The ink of claim 1, further comprising a water-soluble organic solvent.

10. The ink of claim 9, wherein the water-soluble organic solvent is at least one selected from the group consisting of a polyhydric alcohol, a polyhydric alcohol alkyl ether, a polyhydric alcohol aryl ether, a heterocyclic compound comprising nitrogen, an amide, an amine, a compound comprising sulfur, propylene carbonate, and ethylene carbonate.

11. An ink cartridge, comprising:
a container; and
an aqueous ink, which is housed in the container, wherein the ink comprises water and:
(A) a fluorosurfactant having a formula 2:

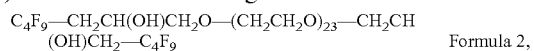

Formula 2, and
(B) N-alkyl-2-pyrrolidone wherein the N-alkyl-2-pyrrolidone is N-octyl-2-pyrrolidone,
wherein the fluorosurfactant is present in an amount of 30% or less by mass, based on
the combined mass of the fluorosurfactant and the N-octyl-2-pyrrolidone.

12. The ink of claim 7, comprising 1% to 20% by mass of the coloring agent, based on the total mass of the ink.

13. The ink of claim 7, comprising 2% to 15% by mass of the coloring agent, based on the total mass of the ink.

14. The ink of claim 10, wherein the water-soluble organic solvent is at least one selected from the group consisting of glycerin, diethylene glycol, 1,3-butanediol, and 3-methyl-1,3-butanediol.

* * * * *